United States Patent
Yang et al.

(10) Patent No.: US 11,636,394 B2
(45) Date of Patent: Apr. 25, 2023

(54) DIFFERENTIABLE USER-ITEM CO-CLUSTERING

(71) Applicant: Microsoft Technology Licensing, LLC, Redmond, WA (US)

(72) Inventors: Longqi Yang, Bellevue, WA (US); Tobias Benjamin Schnabel, Redmond, WA (US); Paul Nathan Bennett, Redmond, WA (US); Susan Theresa Dumais, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 270 days.

(21) Appl. No.: 16/912,453

(22) Filed: Jun. 25, 2020

(65) Prior Publication Data
US 2021/0406761 A1  Dec. 30, 2021

(51) Int. Cl.
| | |
|---|---|
| *G06Q 30/02* | (2012.01) |
| *G06N 20/00* | (2019.01) |
| *G06N 5/04* | (2023.01) |
| *G06Q 30/0201* | (2023.01) |
| *G06Q 30/0204* | (2023.01) |
| *G06Q 30/0601* | (2023.01) |

(52) U.S. Cl.
CPC .............. *G06N 20/00* (2019.01); *G06N 5/04* (2013.01); *G06Q 30/0201* (2013.01); *G06Q 30/0204* (2013.01); *G06Q 30/0631* (2013.01)

(58) Field of Classification Search
CPC ................ G06Q 30/0201; G06Q 30/0204
See application file for complete search history.

(56) References Cited

U.S. PATENT DOCUMENTS

| | | | |
|---|---|---|---|
| 2010/0169158 A1* | 7/2010 | Agarwal | G06N 20/00 705/7.11 |
| 2016/0012088 A1* | 1/2016 | Rossi | G06Q 30/02 707/736 |
| 2018/0276688 A1* | 9/2018 | Duenner | G06N 5/022 |
| 2018/0330192 A1* | 11/2018 | Atasu | G06V 10/96 |
| 2019/0286739 A1* | 9/2019 | Modarresi | G06F 16/2465 |
| 2021/0279552 A1* | 9/2021 | Qiu | G06V 10/82 |

OTHER PUBLICATIONS

"CCCF: Improving Collaborative Filtering via Scalable User-Item Co-Clustering" (Wu, et al., In Proceedings of the 9th ACM International Conference on Web Search and Data Mining, Feb. 22, 2016, pp. 73-82) (Year: 2016).*

(Continued)

*Primary Examiner* — James M Detweiler
(74) *Attorney, Agent, or Firm* — Rainier Patents, P.S.

(57) ABSTRACT

The present concepts relate to a differentiable user-item co-clustering ("DUICC") model for recommendation and co-clustering. Users' interaction with items (e.g., content) may be centered around information co-clusters—groups of items and users that exhibit common consumption behavior. The DUICC model may learn fine-grained co-cluster structures of items and users based on their interaction data. The DUICC model can then leverage the learned latent co-cluster structures to calculate preference stores of the items for a user. The top scoring items may be presented to the user as recommendations.

20 Claims, 6 Drawing Sheets

(56) References Cited

OTHER PUBLICATIONS

Abadi, et al., "TensorFlow: A System for Large-scale Machine Learning", In Proceedings of the 12th USENIX Symposium on Operating Systems Design and Implementation, Nov. 2, 2016, pp. 265-283.

Adar, et al., "Large Scale Analysis of Web Revisitation Patterns", In Proceedings of the SIGCHI Conference on Human Factors in Computing Systems, Apr. 5, 2008, pp. 1197-1206.

Banerjee, et al., "A Generalized Maximum Entropy Approach to Bregman Co-clustering and Matrix Approximation", In Journal of Machine Learning Research, vol. 8, Aug. 2007, pp. 1919-1986.

Breese, et al., "Empirical Analysis of Predictive Algorithms for Collaborative Filtering", In Proceedings of the Fourteenth Conference on Uncertainty in Artificial Intelligence, Jul. 24, 1998, pp. 43-52.

Bu, et al., "Improving Collaborative Recommendation Via User-Item Subgroups", In IEEE Transactions on Knowledge and Data Engineering, vol. 28, Issue 9, Sep. 2016, pp. 2363-2375.

Caruana, et al., "Overfitting in Neural Nets: Backpropagation, Conjugate Gradient, and Early Stopping", In Advances in Neural Information Processing Systems, 2001, 7 Pages.

Celma, Oscar, "Music Recommendation and Discovery in the Long Tail", Springer, 2010.

Chang, et al., "Reading Tea Leaves: How Humans Interpret Topic Models", In Advances in Neural Information Processing Systems, Jan. 2009, 9 Pages.

Chen, et al., "Supervised Community Detection with Line Graph Neural Networks", In Proceedings of the International Conference on Learning Representations, May 6, 2019, 23 Pages.

Christakopoulou, et al., "Local Item-Item Models for Top-N Recommendation", In Proceedings of the 10th ACM Conference on Recommender Systems, Sep. 15, 2016, pp. 67-74.

Christakopoulou, et al., "Local Latent Space Models for Top-N Rcommendation", In Proceedings of the 24th ACM SIGKDD International Conference on Knowledge Discovery & Data Mining, Aug. 19, 2018, pp. 1235-1243.

Dacrema, et al., "Are We Really Making Much Progress? A Worrying Analysis of Recent Neural Recommendation Approaches", In Proceedings of the 13th ACM Conference on Recommender Systems, Sep. 16, 2019, pp. 101-109.

Deodhar, et al., "A Scalable Framework for Discovering Coherent Co-clusters in Noisy Data", In Proceedings of the 26th Annual International Conference on Machine Learning, Jun. 14, 2009, pp. 241-248.

Dhillon, et al., "Information-Theoretic Co-clustering", In Proceedings of the 9th ACM SIGKDD International Conference on Knowledge Discovery and Data Mining, Aug. 24, 2003, pp. 89-98.

Hamilton, et al., "Inductive Representation Learning on Large Graphs", In 31st Conference on Neural Information Processing Systems, 2017, 11 Pages.

Hansen, Christian, "The Truncated SVD as a Method for Regularization", In Journal of BIT Numerical Mathematics, vol. 27, Issue 4, Oct. 1986, 18 Pages.

Harper, et al., "The MovieLens Datasets: History and Context", In ACM Transactions on Interactive Intelligent Systems, vol. 5, Issue 4, Article 19, Dec. 22, 2015, 19 Pages.

He, et al., "Neural Collaborative Filtering", In Proceedings of the 26th International Conference on World Wide Web, Apr. 3, 2017, pp. 173-182.

He, et al., "VBPR: Visual Bayesian Personalized Ranking from Implicit Feedback", In Proceedings of 30th AAAI Conference on Artificial Intelligence, Feb. 21, 2016, pp. 144-150.

Hsieh, et al., "Collaborative Metric Learning", In Proceedings of the 26th International Conference on World Wide Web, Apr. 3, 2017, pp. 193-201.

Hu, et al., "Collaborative Filtering for Implicit Feedback Datasets", In Proceedings of 8th IEEE International Conference on Data Mining, Dec. 15, 2008, 10 Pages.

Jean, et al., "On Using Very Large Target Vocabulary for Neural Machine Translation", In Proceedings of the 53rd Annual Meeting of the Association for Computational Linguistics and the 7th International Joint Conference on Natural Language Processing, vol. 1, Jul. 26, 2015, 10 Pages.

Kingma, et al., "Adam: A Method for Stochastic Optimization", In Repository of arXiv:1412.6980v1, Dec. 22, 2014, 9 Pages.

Leski, Jacek, "Towards a Robust Fuzzy Clustering", In Journal of Fuzzy Sets and Systems, vol. 137, Issue 2, Jul. 16, 2003, pp. 215-233.

Li, et al., "Large-Scale Multi-View Spectral Clustering via Bipartite Graph", In Proceedings of 29th AAAI Conference on Artificial Intelligence, Feb. 21, 2015, pp. 2750-2756.

Li, et al., "Spectral Clustering in Heterogeneous Information Networks", In Proceedings of the 33rd AAAI Conference on Artificial Intelligence, vol. 33, Jul. 17, 2019, pp. 4221-4228.

Liang, et al., "Variational Autoencoders for Collaborative Filtering", In Proceedings of the World Wide Web Conference, Apr. 23, 2018, pp. 689-698.

Luo, et al., "Deep Multi-Graph Clustering via Attentive Cross-Graph Association", In Proceedings of the 13th International Conference on Web Search and Data Mining, Feb. 3, 2020, pp. 393-401.

Marlin, Benjamin, "Modeling User Rating Profiles for Collaborative Filtering", In Advances in Neural Information Processing Systems, 2004, 8 Pages.

Nair, et al., "Rectified Linear Units Improve Restricted Boltzmann Machines", In Proceedings of the 27th International Conference on Machine Learning, 2010, 8 Pages.

Liben-Nowell, et al., "The Link-Prediction Problem for Social Networks", In Journal of the American Society for Information Science and Technology, vol. 58, Issue 7, May 2007, 23 Pages.

Pedregosa, et al., "Scikit-learn: Machine Learning in Python", In Journal of Machine Learning Research, vol. 12, Oct. 2011, pp. 2825-2830.

Rendle, et al., "BPR: Bayesian Personalized Ranking from Implicit Feedback", In Proceedings of the 25th Conference on Uncertainty in Artificial Intelligence, Jun. 2009, pp. 452-461.

Resnick, et al., "GroupLens: An Open Architecture for Collaborative Filtering of Netnews", In Proceedings of the ACM Conference on Computer Supported Cooperative Work, Oct. 22, 1994, pp. 175-186.

Sarwar, et al., "Item-Based Collaborative Filtering Recommendation Algorithms", In Proceedings of the 10th International Conference on World Wide Web, May 1, 2001, pp. 285-295.

Vaswani, et al., "Attention Is All You Need", In Proceedings of the 31st Conference on Neural Information Processing Systems, 2017, 11 Pages.

Wang, et al., "Collaborative Deep Learning for Recommender Systems", In Proceedings of the 21th ACM SIGKDD International Conference on Knowledge Discovery and Data Mining, Aug. 10, 2015, pp. 1235-1244.

Wang, et al., "Neural Graph Collaborative Filtering", In Proceedings of the 42nd International ACM SIGIR Conference on Research and Development in Information Retrieval, Jul. 21, 2015, pp. 165-174.

Wen, et al., "Exploring Recommendations Under User-Controlled Data Filtering", In Proceedings of the 12th ACM Conference on Recommender Systems, Oct. 2, 2018, pp. 72-76.

Whang, et al., "Non-Exhaustive, Overlapping Co-Clustering", In Proceedings of the ACM Conference on Information and Knowledge Management, Nov. 6, 2017, pp. 2367-2370.

Wu, et al., "CCCF: Improving Collaborative Filtering via Scalable User-Item Co-Clustering", In Proceedings of the 9th ACM International Conference on Web Search and Data Mining, Feb. 22, 2016, pp. 73-82.

Wu, et al., "Recurrent Recommender Networks", In Proceedings of the 10th ACM International Conference on Web Search and Data Mining, Feb. 6, 2017, pp. 495-503.

Yan, et al., "Constrained Local Graph Clustering by Colored Random Walk", In Proceedings of the World Wide Web Conference, May 13, 2019, pp. 2137-2146.

(56) References Cited

OTHER PUBLICATIONS

Yang, et al., "Community-Affiliation Graph Model for Overlapping Network Community Detection", In Proceedings of IEEE 12th International Conference on Data Mining, Dec. 10, 2012, pp. 1170-1175.

Yang, et al., "OpenRec: A Modular Framework for Extensible and Adaptable Recommendation Algorithms", In Proceedings of the 11th ACM International Conference on Web Search and Data Mining, Feb. 5, 2018, pp. 664-672.

Yang, et al., "Overlapping Community Detection at Scale: A Non-negative Matrix Factorization Approach", In Proceedings of the 6th ACM International Conference on Web Search and Data Mining, Feb. 4, 2013, pp. 587-596.

Ying, et al., "Graph Convolutional Neural Networks for Web-Scale Recommender Systems", In Proceedings of the 24th ACM SIGKDD International Conference on Knowledge Discovery & Data Mining, Aug. 19, 2018, pp. 974-983.

"International Search Report and Written Opinion Issued in PCT Application No. PCT/US2021/034379", dated Sep. 14, 2021, 9 Pages.

Wang, et al., "Solving the Sparsity Problem in Recommendations via Cross-Domain Item Embedding Based on CoClustering", In Proceedings of the Twelfth ACM International Conference on Web Search and Data Mining, Feb. 11, 2019, pp. 717-725.

* cited by examiner

DIFFERENTIABLE USER-ITEM CO-CLUSTERING

BACKGROUND

The ability to infer user preferences and to recommend preferred items to users based on their behavioral history is a growing art with a wide range of applications. Improving recommendation models can enhance user experience as well as generate higher revenues.

BRIEF DESCRIPTION OF THE DRAWINGS

The accompanying drawings illustrate implementations of the present concepts. Features of the illustrated implementations can be more readily understood by reference to the following descriptions in conjunction with the accompanying drawings. Like reference numbers in the various drawings are used where feasible to indicate like elements. The accompanying drawings are not necessarily drawn to scale. In the figures, the left-most digit of a reference number identifies the figure in which the reference number first appears. The use of similar reference numbers in different instances in the description and the figures may indicate similar or identical items.

DETAILED DESCRIPTION

Figure 1:
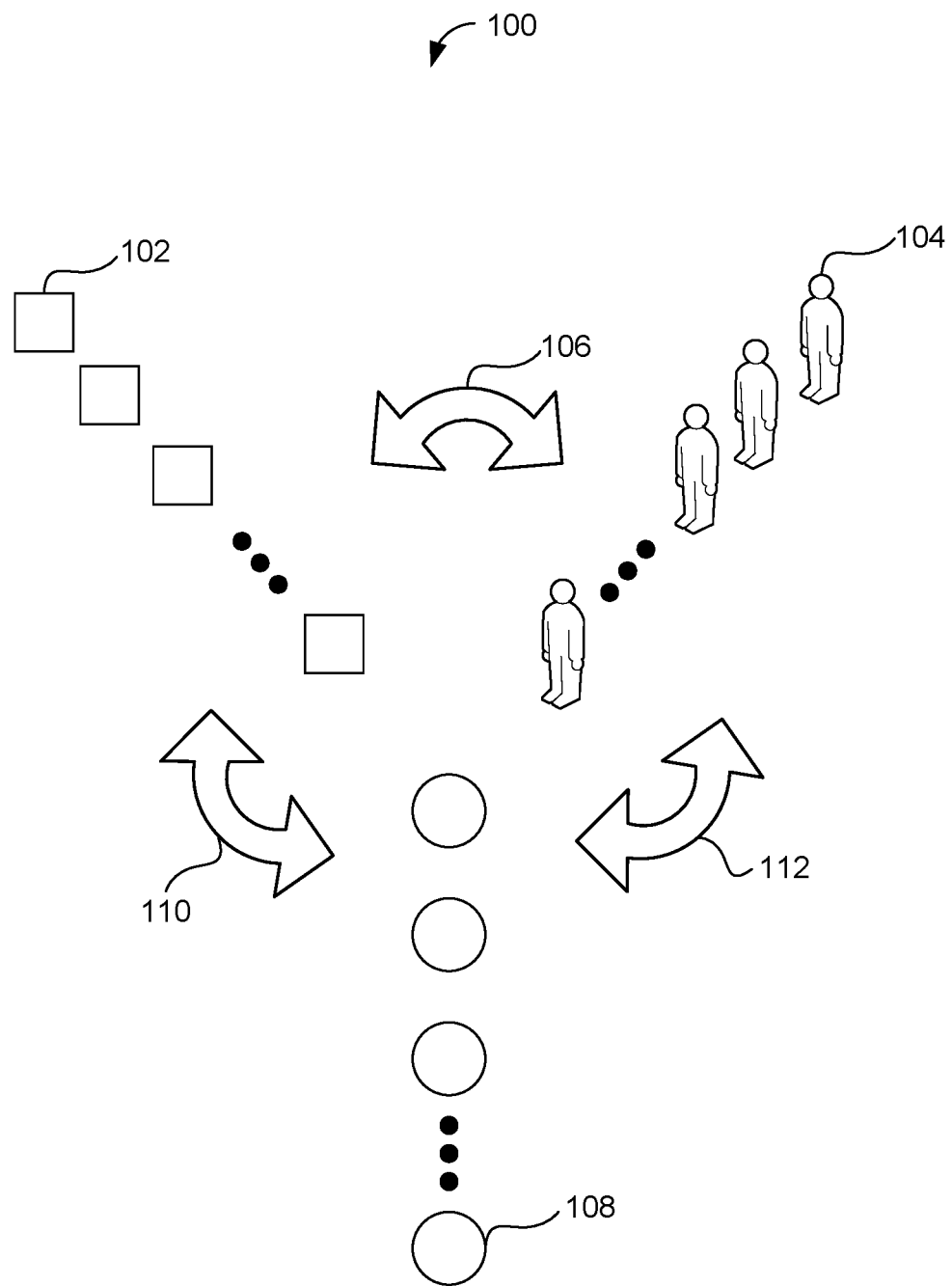
FIG. 1 shows a conceptual diagram of a differentiable user-item co-clustering environment, consistent with the present concepts.

The present concepts relate to differentiable user-item co-clustering ("DUICC"), which may be a recommendation model that can detect co-cluster structures in user and item space as well as recommend items to users. A co-cluster (which can be considered a community) may represent a group of users who have common interest in a group of items. The detection of co-existence of users and items in co-cluster structures may improve recommendation performance.

People's consumption behavior (such as, purchasing items, visiting websites, listening to songs, or watching videos) can be used as signals for fueling recommendation systems. People with similar interests tend to interact with similar content. This observation has motivated much research and development in (1) collaborative filtering, (2) community detection on network data, and (3) co-clustering. Collaborative filtering has been a popular choice for recommendation algorithms.

First, collaborative filtering involves mining correlations between users and the items they consume. Common approaches for collaborative filtering include nearest neighbor-based methods, matrix factorization, and deep neural networks. However, these algorithms mostly look at correlations between individual users and individual items at the instance level. This approach can be inefficient because it does not leverage prior knowledge about the data generating process into the model which can help alleviate data sparsity. Other prior techniques cluster user and item embeddings in a separate post hoc process. This can result in suboptimal performance, because the clustering step does not take into account recommendation performance.

Second, community detection is a widely studied topic in the context of networks and graphs. Existing approaches include factorization, deep learning, label propagation, and spectral methods. However, many existing algorithms cannot handle overlapping communities or are not scalable to large datasets (e.g., billion-scale). One community detection algorithm called Cluster Affiliation Model for Big Networks ("BigClam") leverages non-negative matrix factorization to detect overlapping communities at scale. However, communities found by BigClam are not very coherent. This may be due to the fact that BigClam does not sufficiently leverage the bipartite structure of user interaction data. Moreover, it is unclear how algorithms solely designed for community detection can be used for a recommendation task.

Third, co-clustering (also known as bi-clustering, block clustering, or two-mode clustering) is a data mining technique which allows clustering of the rows and columns of a matrix. The user-item consumption matrix can also be viewed as a bipartite graph with edges between user nodes and item nodes indicating whether or not an item was consumed by a user. This transformation allows co-clustering methods to be applied to the problem. However, most of the co-clustering methods developed to date can only operate on medium-sized data with at most thousands of rows or columns, and thus are unsuitable for large-scale community detection problems. Also, similar to traditional community detection algorithms, co-clustering methods do not offer interfaces for recommendations.

The present concepts relate to DUICC, which can identify co-cluster membership of both content items and people at a fine-grained level and then use this co-cluster structure to efficiently recommend items on-the-fly. DUICC may leverage the idea that many interactions that similar people have with similar items take place around user-item co-clusters or information communities, i.e., groupings of people who share common behaviors centered primarily around related content, such as information sources. For example, people who have repeatedly visited a website for a data mining conference may form a type of information co-cluster whose members may be likely to be interested in other data mining-related websites. Accordingly, contrary to conventional myopic techniques that look narrowly at only instances of interactions between users and items, DUICC can account for co-clusters of people who share common consumption behaviors around sets of similar and related items. Moreover, DUICC can provide substantially improved recommendation performance on sparse data, while producing coherent and interpretable co-clusters.

FIG. 1 shows a conceptual diagram of an example DUICC environment 100, consistent with the present concepts. The DUICC environment 100 may include items 102. The items 102 can represent anything that people can interact with or consume. For example, the items 102 can include products, services, or informational contents, including webpages, movies, songs, merchandise, news, media, channels, podcasts, software, books, genres, authors, sports teams, celebrities, stores, professional organizations, subscriptions, food, apparel, destinations, etc. These are just some examples to illustrate the wide variety of the types of items 102 that can be included in the DUICC environment 100. Let i be an item 102, and let I be the set of all items 102.

The DUICC environment 100 may include users 104. The users 104 may present individual people, user accounts, user personas, businesses, or any entities that can interact with the items 102. Let u represent a user 104, and let $\mathcal{U}$ represent the set of all users 104.

The DUICC environment 100 may include user-item interactions 106, which may include data that represents historical interactions between particular users 104 and particular items 102. An instance of a user-item interaction 106 may be formed as a result of a user 104 viewing, reviewing, sharing, or purchasing a product; ordering or reviewing a service; opening, reading, or downloading an article; visiting or bookmarking a website; previewing, watching, downloading, or liking a movie; purchasing, downloading, listening to, adding to a playlist, or disliking a song; reviewing, adding to a shopping list, checking the price of, or ordering merchandise; subscribing to or liking a channel; subscribing to, listening to, or sharing a podcast; downloading, installing, or launching software; purchasing, downloading, or reading a book; adding to favorites, searching by, or selecting a genre, clicking or buying books written by an author; watching a game played by, purchasing a ticket for, or buying memorabilia related to a sports team; visiting or buying from a store (whether a physical brick-and-mortar store or a digital online store); joining or renewing a membership to an organization, etc. These are merely examples. Virtually any activity or any instance of association between a user 104 and an item 102 can form a user-item interaction 106. Accordingly, the user-item interactions 106 may represent consumption behavior of the users 104 with respect to the items 102. In one example implementation, the user-item interactions 106 may be represented by sets of items 102, where each set of items 102 includes the items 102 a particular user 104 has interacted with. Let $\mathcal{M} = \{(u, i)\}$ represent a set of user-item interactions 106, where user u interacted with item i.

Consistent with the present concepts, a DUICC model may form co-clusters 108 (or information communities). Let c represent a co-cluster 108, and let C represent the set of all co-clusters 108. The co-clusters 108 may group similar or related items 102. Additionally, the co-clusters 108 may group similar or related users 104 with similar consumption behavior. In one implementation, the membership of an item 102 in a co-cluster 108 and the membership of a user 104 in a co-cluster 108 may not be all or nothing. Rather, each item 102 and each user 104 may have a degree to which they belong (or an affinity) to each of the co-clusters 108. That is, each user 104 and each item 102 may belong to multiple co-clusters 108 with varying degrees of association (or varying affinities).

As such, consistent with the present concepts, the DUICC model may determine item-co-cluster affinity scores 110 that represent the affinities between the items 102 and the co-clusters 108, and may also determine user-co-cluster affinity scores 112 that represent the affinities between the users 104 and the co-clusters 108. For example, a user 104 who repeatedly visited several websites relating to data mining may be determined to have a strong user-co-cluster affinity score 112 to a co-cluster 108 that represents the data mining topic. Additionally, an item 102 representing a data mining conference website that was visited by several user 104 who repeatedly visited several data mining-related websites may be determined to have a strong item-co-cluster affinity score 110 to the data mining co-cluster 108. On the contrary, another item 102 representing a website that is completely unrelated to the topic of data mining and has not been consumed by users 104 who have strong user-co-cluster affinity scores 112 to the data mining co-cluster 108 may be determined to have a weak item-co-cluster affinity score 110 to the data mining co-cluster 108. Similarly, another user 104 whose consumption history (i.e., the user-item interactions 106 for that user 104) exhibits zero interest in data mining (i.e., zero interactions with items 102 that have strong item-co-cluster affinity scores 110 to the data mining co-cluster 108) may be determined to have a weak user-co-cluster affinity score 112 to the data mining co-cluster 108.

In one example implementation, users $\mathcal{U}$ and items I may be co-clustered into N overlapping co-clusters. The number of co-clusters N may be a preset hyperparameter. For example, the number of co-clusters N may be preset to 1,000 or 2,000. Let $a_u^c \in \mathbb{R}^+$ denote the user-co-cluster affinity score 112 of user u to co-cluster c, and let $a_i^c \in \mathbb{R}^+$ denote the item-co-cluster affinity score 110 of item i to co-cluster c. The non-negativity of both the user-co-cluster affinity score $a_u^c$ and the item-co-cluster affinity score $a_i^c$ can ensure that their absolute values directly reflect the membership strength of user u and item i in co-cluster c. Under this soft-assignment paradigm, any users 104 or items 102 can belong to multiple co-clusters 108.

These ties formed in the co-clusters 108 may be informed by the consumption of the items 102 by the users 104, and thus are advantageous over ties in social networks. One example advantage of distilling consumption behavior (the user-item interactions 106) into co-clusters 108 includes improved generalization on large-scale datasets, since directly learning user-to-user, user-to-item, or item-to-item correlations can be suboptimal due to sparsity and decreasing overlap among those signals as the number of items 102 and users 104 grows. Moreover, the DUICC model can infer co-cluster structures that are not only recommendation-centric, but also capture latent structures, such as location, profession, and interests, without the need to explicitly model each dimension. Furthermore, identifying co-cluster membership of both items 102 and users 104 at a fine-grained level can enable the DUICC model to make more effective and transparent recommendations built on the users' long-term interests rather than short-term topical spikes or trending popular items.

As explained above, the DUICC model may take the user-item interactions 106 between the users 104 and the items 102 as input and define the co-clusters 108. Consequently, users 104 assigned to the same co-cluster 108 may be like-minded, have common preferences, exhibit similar consumption patterns, and/or share similar interests with respect to the items 102 in that particular co-cluster 108. Then, the DUICC model may generate a recommendation of items 102 for a particular user 104 that the user 104 may be likely to want to interact with. The recommendations may be in the form of preference scores calculated for all of the items 102. Then, the highest scored items 102 can constitute the recommendations. That is, given the set of items $I_u \subseteq I$ that user u interacted with in the past, the DUICC model can perform the task of recommendation by learning a function r that predicts the preference s of user u on item i for all items I.

$$s_{ui} = r(I_u, i), i \in \{1, \ldots, |I|\} \qquad \text{Formula 1}$$

In Formula 1, let $s_{ui} \in \mathbb{R}$ denote the preference score of user u for item i.

The preference scores of all the items 102 that are output by the DUICC model may be used to present recommendations to the user 104. For example, the items 102 may be sorted by their corresponding preference scores, and then a certain number of the highest scored (top ranked) items 102 can be presented to the user as recommendations, suggestions, advertisements, tips, etc. For example, a software application (e.g., a browser) may present the recommended items (e.g., URLs, movies, songs, books, etc.) to the user 104 on a graphical user interface ("GUI"). In one implementation, the recommended items 102 may exclude the set of items $I_u$ that the user 104 has already interacted with. For example, a list of recommended movies may exclude the set of movies the user 104 has already seen in the past.

Figure 2:
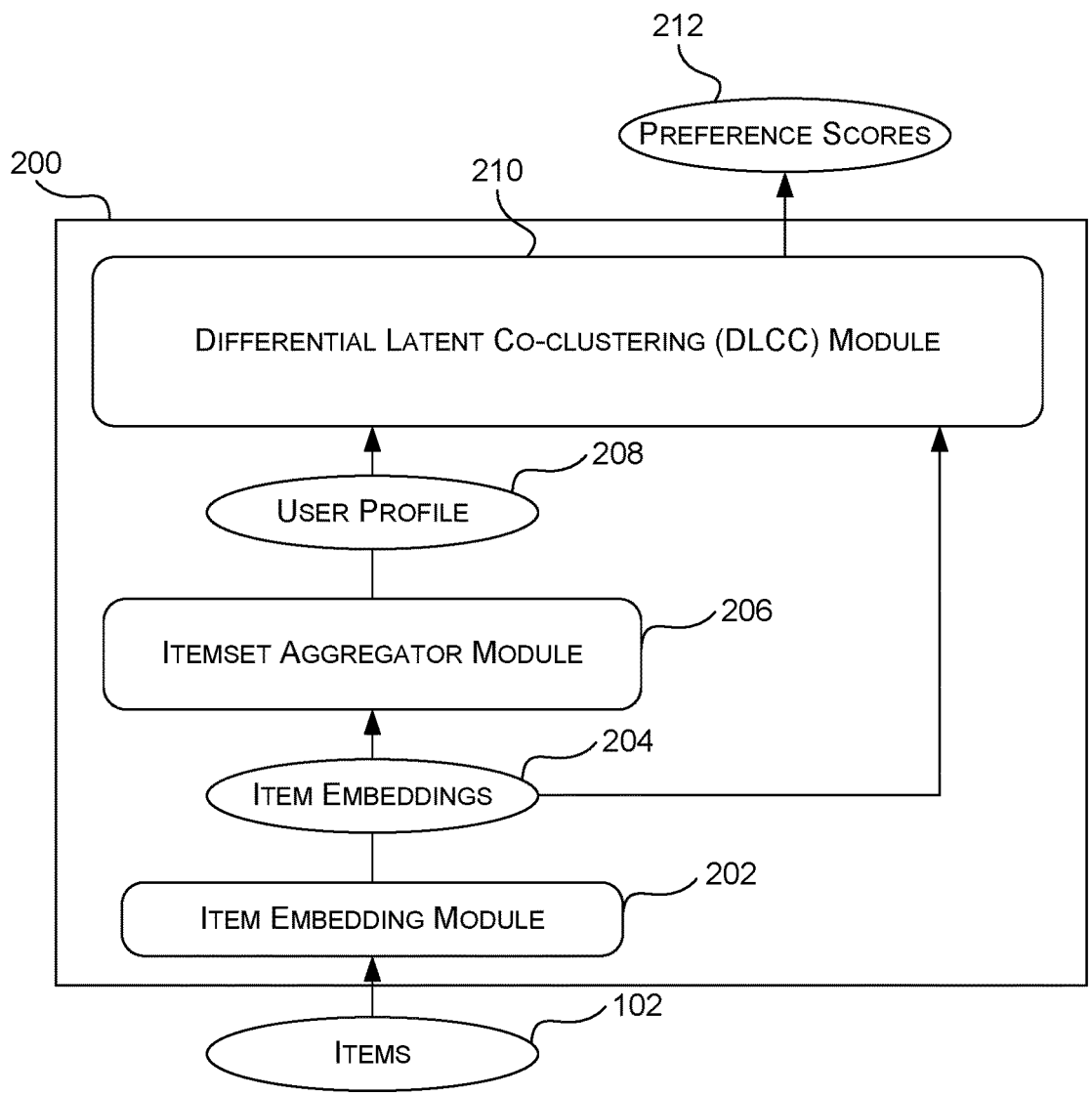
FIG. 2 shows an architectural diagram of a differentiable user-item co-clustering model, consistent with the present concepts.

FIG. 2 shows an architectural diagram of an example DUICC model 200, consistent with the present concepts. The input to the DUICC model 200 may include a set of items 102, a set of users 104, and/or user-item interactions 106 between the users 104 and the items 102. In one implementation, the DUICC model 200 may take as input a set of items 102 that a user 104 has interacted with. Let $I_u = \{i, j, k\}$ represent a set of items $\{i, j, k\}$ that user u interacted with.

The DUICC model 200 may include an item embedding module 202 that can convert the set of items 102 that the user 104 interacted with into item embeddings 204. Let $\{e_i, e_j, e_k\}$ represent the item embeddings 204. In one implementation, an item embedding $e_i$ may be a dense vector representing the embedding for item i with dimensionality d. That is, an item embedding vector $e_i$ may contain a list of d real numbers. For example, if d=3, then an example item embedding vector $e_i$ may be [−0.2, 0.5, 1.0]. The item embeddings 204 $\{e_i, e_j, e_k\}$ may be randomly initialized, and then fine-tuned during training. In an alternative implementation, the items 102 may be featurized, such that, rather than learning one item embedding 204 per item 102, the DUICC model 200 can learn a mapping of the features or attributes of the item 102 into a representation space.

The DUICC model 200 may include an itemset aggregator module 206. The itemset aggregator module 206 may build user profiles 208 (or user embeddings) from the item embeddings 204. That is, the itemset aggregator module 206 can construct a representation 208 of a user 104 on-the-fly by aggregating the representations 204 of the items 102 that the user 104 interacted with in the past. For instance, the itemset aggregator module 206 may take the item embeddings 204 as inputs and then output user profiles 208. Let $g_u^c$ represent the user profiles 208 (or user embeddings) for user u generated from the item embeddings $\{e_i, e_j, e_k\}$. The itemset aggregator module 206 will be explained in more detail below in connection with FIG. 3.

The DUICC model 200 may include a differentiable latent co-clustering ("DLCC") module 210. The DLCC module 210 may take all the item embeddings 204 from the item embedding module 202 and all the user profiles 208 built by the itemset aggregator module 206, build the cluster structure within the items and the users (i.e., detect the co-clusters 108), and output preference scores 212 of the items 102. These preference scores 212 calculated for the items 102 may be used to provide a list of recommended items 102. As explained above with respect to Formula 1, preference score $s_{ui}$ may indicate how much user u is likely to prefer to consume item i. The DLCC module 210 will be explained in more detail below in connection with FIG. 4.

The fine-grained subgroup structures in the co-clusters 108 can enable the DUICC model 200 to detect and leverage complex and latent dimensions in the user preference space, such as location or lifestyle, without having to manually and explicitly model these dimensions. That is, there is no need to manually and explicitly define each co-cluster. To make the co-clusters 108 align with down-stream recommendation performance, a supervised recommendation loss can be used, which will be explained in detail below in connection with subsequent figures. The three modules in the DUICC model 200—the item embedding module 202, the itemset aggregator module 206, and the DLCC module 210—may be fully differentiable and can be trained end-to-end. The three modules may be implemented in software, hardware, or a combination.

Consistent with the present concepts, the DUICC model 200 may unify recommendation and co-clustering based on the insight that the co-clusters 108 can drive the dynamics of the user-item interactions 106. That is, a user 104 may be more likely to interact with an item 102 if the user 104 and the item 102 belong to the same co-cluster 108 or a more similar set of co-clusters 108. From a modeling perspective, this means that the preference function r for calculating the preference score s of user u can be expressed through her latent co-cluster membership.

Figure 3:
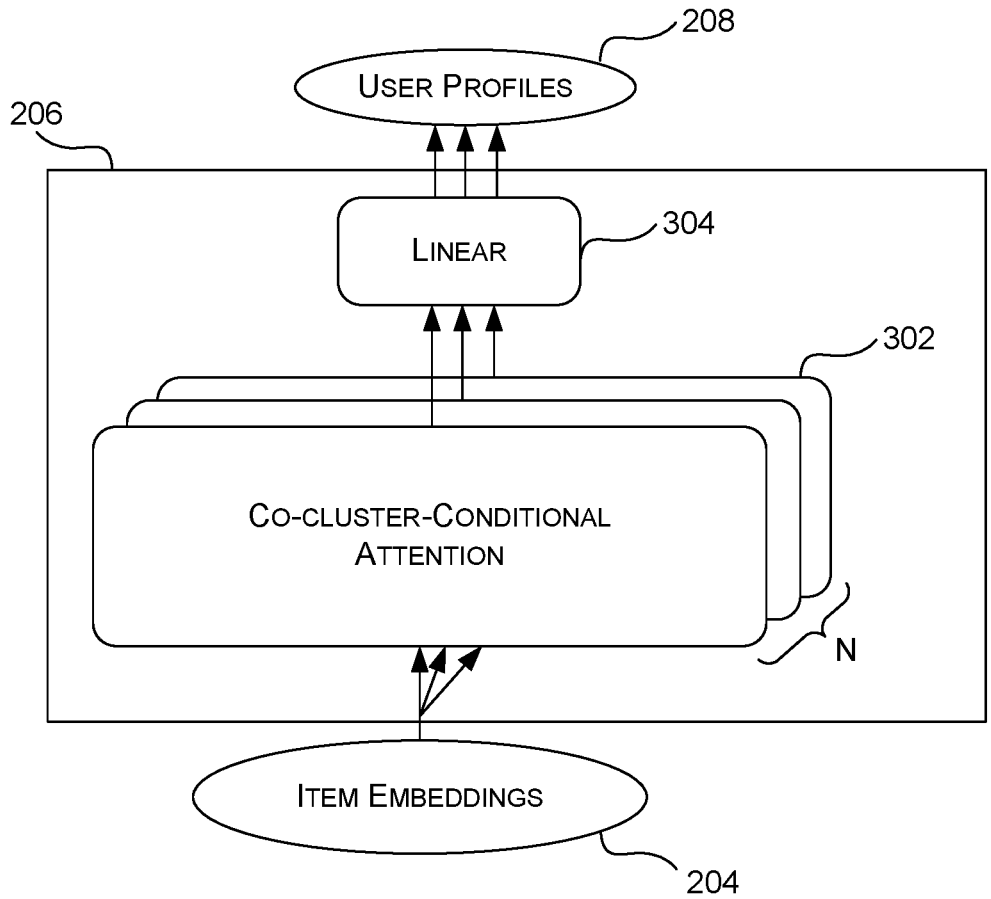
FIG. 3 shows an architectural diagram of an itemset aggregator module, consistent with the present concepts.

FIG. 3 shows an architectural diagram of the itemset aggregator module 206, consistent with the present concepts. As explained above, the itemset aggregator module 206 may build a user profile 208 for each user 104 using the item embeddings 204 that represent the items 102 that the user 104 has interacted with. In one implementation, the itemset aggregator module 206 may use a co-cluster-conditional attention layer 302 to aggregate the item embeddings 204 into the user profiles 208 ($g_u^c$, c=1, ..., N). In one implementation, each user 104 may be represented by N user embedding vectors ($g_u^1, \ldots, g_u^N$). Each user embedding vector $g_u^c$ may contain a list of d real numbers, where d represents the dimensionality. For example, if d=3, then an example user embedding vector $g_u^c$ may be [0.05, 0.8, −0.2].

For instance, given the set of items $I_u$ that user u interacted with, the item embedding module 202 may generate the representations of those items as item embeddings ($e_i, i \in I_u$). Then, the itemset aggregator module 206 may employ a co-cluster-conditional attention mechanism 302 to construct user representations $g_u^c$, for example, by employing an N-head dot-product attention approach shown in Formula 2.

$$g_u^c = W \sum_{i \in I_u} \text{softmax}\left(\frac{h_c^T \cdot e_i}{\sqrt{d}}\right) e_i, \quad \text{Formula 2}$$

In Formula 2, d may denote the dimensionality of item embeddings $e_i$, and each head $h_c$ may build a co-cluster-conditional user representation ($g_u^c$, c=1, ..., N) by assigning higher weights to more predictive items 102. In addition, a scaling factor $$\frac{1}{\sqrt{d}}$$

may be added to address the potential vanishing gradients problem, and a linear projection 304 ($W \in \mathbb{R}^{d \times d}$) may be added to align the feature spaces of users 104 and items 102. The numerator ($h_c^T \cdot e_i$) may compute how important item i is for co-cluster c, and the softmax function may compute the weight assigned to each item embedding $e_i$. Accordingly, the user embedding $g_u^c$ for co-cluster c may be a weighted average of the item embeddings for the items that the user has interacted with ($e_i, i \in I_u$). The parameters W and $h_c$ may be optimized during the training process.

The attention mechanism 302 may be conditioned on the co-clusters 108. Each co-cluster 108 may have an attention head, and the attention head may determine which items 102 will be assigned higher weights and which items 102 will be assigned lower weights. The co-cluster-conditional attention mechanism 302 may be designed to learn the extent to which each item 102 is predictive of the strength of that signal from that item 102 to that co-cluster 108.

In one implementation, the user profiles 208 may be a weighted sum of the items 102 a given user 104 has interacted with. The set of user embeddings 208 ($g_u^1, \ldots, g_u^N$) output by the itemset aggregator module 206 may be used by the DLCC module 210 to cluster and assign user u to the N co-clusters. Compared to using a global attention mechanism, the DUICC model 200, consistent with the present concepts, may use the co-cluster-conditional attention 302, which can allow predictive items 102 to vary across co-clusters 108.

The itemset aggregator module 206, consistent with the present concepts, may provide a number of advantages compared to having explicit user representations. Beyond eliminating the need to fit such individual user representations, the itemset aggregator module 206 may consume constant memory with respect to the number of users 104, because the parameters of the itemset aggregator module 206 can be shared across all users 104. Hence, the DUICC model 200 can be easily scaled to serve a massive number of users (e.g., billions of users), whereas traditional methods typically scale as $O(|\mathcal{U}|)$. Moreover, the itemset aggregator module 206 may allow the DUICC model 200 to quickly respond to any changes in users' interaction history 106 (e.g., adding or removing an item from $I_u$) since inferring the user profiles 208 may take only two highly parallelizable linear operations.

In one implementation, the computational cost of building the co-cluster-conditional user representations $g_u^c$ may be reduced by caching a scalar $Z_c$ as:

$$Z_c = \sum_{i \in I_u} \exp\left(\frac{h_c^T \cdot e_i}{\sqrt{d}}\right) \quad \text{Formula 3}$$

Whenever user u interacts with a new item j, such that the set of items $I_u$ that user u has interacted with is updated to include the new item j, the user representation $g_u^c$ can be quickly updated using the cached scalar $Z_c$ by first calculating an updated scalar $Z'_c$ and then calculating an updated user representation $g_u^{c\prime}$ using Formulas 4 below without recomputing new user representations for all items $i \in I_u$.

$$Z'_c = Z_c + \exp\left(\frac{h_c^T \cdot e_j}{\sqrt{d}}\right) \quad \text{Formulas 4}$$

$$g_u^{c\prime} = \frac{1}{Z'_c}\left[g_u^c \cdot Z_c + W \cdot \exp\left(\frac{h_c^T \cdot e_j}{\sqrt{d}}\right) e_j\right]$$

Accordingly, the computational cost for such updates can remain constant $O(1)$ and need not grow with the increasing volume of items-user interaction history $O(|I_u|)$. This paradigm can be applied to cases where the users 104 intentionally or unintentionally alter their profiles (e.g., removing an item 102 from the set of items $I_u$ the user 104 has interacted with).

Therefore, the DUICC model 200 can immediately react to the user's new interactions 106 with new items 102 (e.g., a user 104 visited a new URL or made a new purchase). The DUICC model 200 may update the user profile 208 on the fly.

In one example implementation, the user 104 may be allowed to manually delete certain user-item interactions 106 from her history via a GUI, for example, for privacy purposes or to tweak future recommendations. In another example implementation, the user-item interactions 106 may include timestamps indicating when the user-item interactions 106 occurred, such that old or outdated user-item interactions 106 may be automatically removed. That is, one or more stale items 102 that the user 104 interacted with long time ago (e.g., longer than a certain threshold time) may be automatically pruned or removed from the set of user-item interactions 106 for the user 104 to keep the set of user-item interactions 106 fresh and better reflective of the user's current preferences and current consumption behavior. As explained above, updating the user profiles $g_u^c$ after pruning stale items {i, j, k} from the set of items $I_u$ for user u may be performed in the order of constant time $O(1)$.

Figure 4:
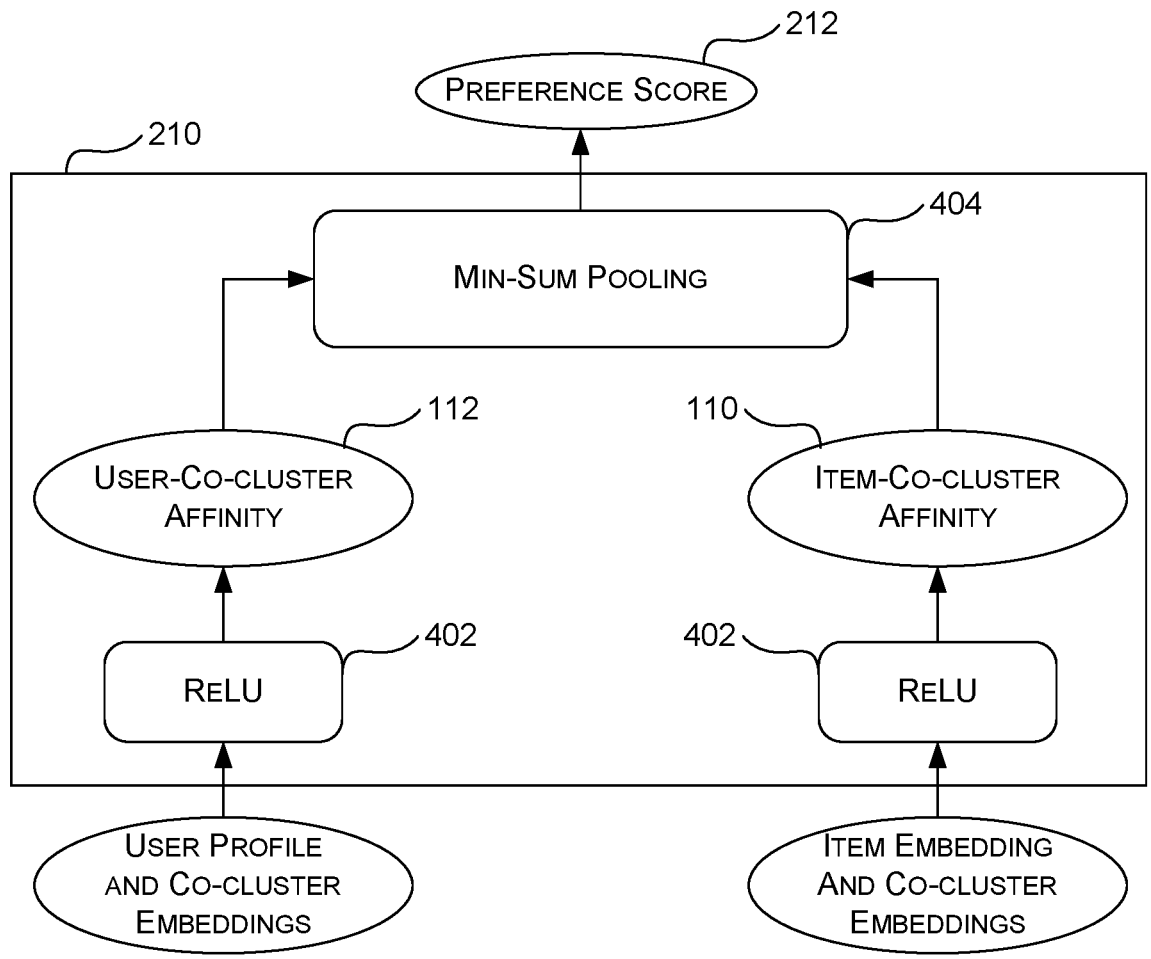
FIG. 4 shows an architectural diagram of a differentiable latent co-clustering module, consistent with the present concepts.

FIG. 4 shows an architectural diagram of the DLCC module 210, consistent with the present concepts. In one implementation, each co-cluster c may be represented by a co-cluster embedding $e_c$ having dimensionality d, which may be a vector containing a list of d real numbers. For example, if d=3, then an example co-cluster embedding vector $e_c$ may be [1.2, −0.2, 0.5]. Similar to the item embeddings $e_i$, the co-cluster embeddings $e_c$ may be randomly initialized and then fine-tuned or optimized during the training process.

The DLCC module 210 may learn items representations $e_i$ and co-cluster representations $e_c$, and compute item-co-cluster affinity score $a_i^c$ of how close item i is to co-cluster c. Further, the DLCC module 210 may use the user representations $g_u^c$ built by the itemset aggregator module 206 to calculate user-co-cluster affinity score $a_u^c$ of how close user u is to co-cluster c. Accordingly, the DLCC module 210 can relate items 102 to co-clusters 108 as well as relate users 104 to co-clusters 108.

The DLCC module 210 may learn and construct N co-clusters and model the distribution and assignments of the item membership 110 and user membership 112 in the co-clusters 108 based on the user-item interaction input data 106 using machine learning. In one example implementation, the co-cluster assignments and distribution of the items 102 and the users 104 may be randomly initialized. The co-cluster assignments (i.e., user and item distributions to the co-clusters 108) can be parameterized. Those parameters may be fine-tuned by an objective function. Thus, one of the goals of the DUICC model 200 may be to minimize the objective function by fine-tuning the parameters. Using a back-propagation algorithm, the gradient with respect to each parameter may be calculated and then used to update the parameter for each iteration. For instance, the variable W and vectors $h_c$ and $e_i$ in Formula 2 are parameters that may be fine-tuned during training.

As explained above, the DUICC model 200 may be trained by fine-tuning the co-cluster assignments and distribution based on the user-item interaction data 106 fed into the DUICC model 200. The DLCC module 210 may take as input all the user profiles 208 as well as all the item embeddings 204, and may output the preference scores 212. The DLCC module 210 may learn co-cluster embeddings $e_c$. The community embeddings $e_c$ may be implicitly or indirectly affected by the item embeddings $e_i$ and the user embeddings $g_u^c$ during training. The DLCC module 210 may calculate the dot product between the user embeddings 208 and the co-cluster embeddings ($g_u^c \cdot e_c$, c=1, . . . , N), calculate the dot product between the item embeddings 204 and the co-cluster embeddings ($e_i \cdot e_c$, c=1, . . . , N), and then aggregate them using rectified linear units ("ReLUs") 402. The ReLUs 402 may be applied to force nonnegativity of both the user-co-cluster affinity scores 112 and the item-co-cluster affinity scores 110. Furthermore, in one implementation, the DLCC module 210 may use the ReLUs 402 to calculate the affinity scores $a_u^c$ and $a_i^c$, and use a min-sum pooling operation 404 to predict or calculate a preference score $s_{ui}$ of user u for item i from the user profiles $g_u^c$, co-cluster embedding $e_c$, and item embedding $e_i$.

Therefore, the DLCC module 210 may define clusters of users 104 and items 102 by modeling their affinities (the user-co-cluster affinity scores 112 and the item-co-cluster affinity scores 110) to N latent co-clusters 108. In one implementation, community embeddings $e_c$ and affinity scores $a_u^c$ and $a_i^c$, may be optimized together. The DUICC model 200 may be thus trained end-to-end. For example, a co-cluster embedding representation $e_c$ for each co-cluster c may be learned, and user-co-cluster affinity scores $a_u^c$ and item-co-cluster affinity scores $a_i^c$ may be computed as:

$$a_u^c = \max(g_u^{cT} \cdot e_c, 0)$$

$$a_i^c = \max(e_i^T \cdot e_c, 0) \quad \text{Formulas 5}$$

For example, the user-item interactions 106 may include co-occurrences of similar items 102 (e.g., many users 104 who interacted with item i also interacted with item j). These co-occurrence signals can be leveraged to learn similarities among the set of items I.

In one example implementation, the DUICC model 200 may be trained using masking-based training loss. For instance, one item 102 from the set of items $I_u$ that a user 104 has interacted with may be held out, and then the DUICC model 200 may be trained using the rest of the items 102 to best predict the held-out item 102. If the DUICC model 200 correctly predicts the held-out item 102, then back-propagation loss may not be incurred. Otherwise, if the DUICC model 200 does not correctly predict the held-out item 102, then the signal and the loss may be propagated to adjust the parameters of each layer that computes the embeddings.

There are many choices of loss functions that can be used to train the DUICC model 200. In one example implementation, the DUICC model 200 may be trained using softmax classification loss, which may be preferable over pointwise losses in binary recommendation, because softmax classification loss can encourage better weight assignments for top-N rankings. In an example implementation, sampling may be employed rather than computing the full softmax loss to be able to handle large item vocabulary sizes. Furthermore, to prevent the DUICC model 200 from learning trivial relationships, the items $I_u$={i, j, k} that the user 104 has already interacted with may be masked out.

For example, given the set of items $I_u$ that user u has interacted with, a randomly selected item k in the set of items $I_u$ (i.e., k∈$I_u$) may be held out during training time and the rest of the items 102 may be fed into the DUICC model 200 to compute the representations and the scores. Given the representations and the scores, the following formula may be used to compute the loss $\mathcal{L}_u$ on a sampled set $I_{sp}$ of negative training examples similar in spirit to the sampled softmax. The per-user loss $\mathcal{L}_u$ being minimized during training may be:

$$\mathcal{L}_u(I_{sp}, k) = \underbrace{-\alpha \log\left(\frac{s_{uk}}{\sum_{v_i \in I_{sp}} s_{ui}}\right)}_{\text{cross entropy}} + \underbrace{\lambda \sum_c \left(a_u^c + \sum_{i \in I_{sp}} a_i^c\right)}_{\text{L1 regularization}} \quad \text{Formula 6}$$

where α may be a hyperparameter for label smoothing, λ may be a hyperparameter for controlling the balance of the weight of the cross entropy and of the L1 regularization, $a_u^c$ may be a score representing user u's affinity to community c, and $a_i^c$ may be a score representing item i's affinity to community c. $I_{sp}$ may be a set of negative items that user u has not interacted with. k may be the item that was held out of the set of items that user u has interacted with.

The DUICC model 200 may be optimized to predict the held-out item k. The rest of the non-held-out items may be used to build user representations. The cross entropy term may push the DUICC model 200 to predict higher score (s) for the item that the user interacted with (k) against negative items ($I_{sp}$). The L1 regularization term may optimize the affinity scores $a_u^c$ and $a_i^c$ to be sparse, such that each user 104 and/or each item 102 belongs to only a small subset of co-clusters 108. This can alleviate the problem of overfitting and improve model performance.

During training, all model parameters may be optimized and updated, including item embeddings $e_i$, user embeddings $g_u^c$, and co-cluster embeddings $e_c$, as well as other model parameters (e.g., W and $h_c$). During training, $s_{uk}$, $s_{ui}$, $a_u^c$, and $a_i^c$ may be computed using these parameters, and when the loss function $\mathcal{L}_u$ (Formula 6) is minimized, the gradients can be back propagated to update them. The DUICC model 200 may be fully differentiable; that is, the gradients with respect to each model parameter can be computed using the chain rule, for example. After the gradients with respect to each parameter are computed, the parameters may be updated using the stochastic gradient descent (SGD) algorithm, for example, the Adam method. The loss function $\mathcal{L}_u$ can compute gradients with respect to each model parameter, and the goal of optimization may be to minimize the loss function $\mathcal{L}_u$.

To create the set of negative samples $I_{sp}$, a masking mechanism may be employed to prevent the DUICC model 200 from seeking trivial solutions (e.g., identity mapping). For instance, the set of items $I_u$ that the user u has already interacted with may be excluded.

$$I_{sp} = \text{Sample}(I \setminus I_u) \cup \{k\} \quad \text{Formula 7}$$

In other words, the DUICC model 200 may not be penalized for predictions it makes on positive examples other than the held-out item k. Additionally, since the user-item interactions 106 may be incomplete or uncertain, a label smoothing term a may be used to soften the targets in the cross entropy term in Formula 6. This cross entropy term that includes $s_{uk}$, which represents the user-item interaction 106 of user u with item k, may provide supervision for all the users 104 and items 102.

Furthermore, to encourage compact co-cluster structures, L1 regularization on the sum of affinity scores across the users 104 and the items 102 may additionally be used. Eventually, the per-user loss $\mathcal{L}_u$ may be averaged across a minibatch to train the DUICC model 200.

After training, the co-cluster assignments may reflect the co-cluster structures detected in the interaction data 106. The DLCC module 210 may leverage the co-clusters 108 to predict and output a user preference vector $s_u$ that includes a preference score $s_{ui}$ for the preference of user u for all the items ∀i∈I.

Based on the user-co-cluster affinity score 112 and the item-co-cluster affinity score 110, a lightweight min-sum pooling operation 404 may be applied to bridge the gap between structures of co-clusters 108 and recommendations. That is, the preference score $s_{ui}$ of user u towards item i may be computed as:

$$s_{ui} = \sum_c \min(a_u^c, a_i^c) \quad \text{Formula 8}$$

where the inner term $\min(a_u^c, a_i^c)$ may calculate the amount of co-cluster overlap between user u and item i in terms of co-cluster c and can be viewed as a "soft AND" operator. The outer summation Σ then can aggregate such overlaps across all co-clusters C. The present concepts may allow isolation of the contributions that each co-cluster c makes to the preference score vector $s_u$, while also being fully differentiable to enable end-to-end optimization.

Generally, user u may be more likely to prefer item i if user u is part of co-cluster c and item i is also part of co-cluster c. That is, the preference score $s_{ui}$ may be higher if the user-co-cluster affinity score $a_u^c$ of user u to co-cluster c is higher and if the item-co-cluster affinity score $a_i^c$ of item i to co-cluster c is higher. For example, if co-cluster c relates to automobiles and user u has a strong affinity score $a_u^c$ to automobiles and item i is strongly related $a_i^c$ to automobiles, then the preference score $s_{ui}$ will be high.

Consistent with the present concepts, there may be two sets of outputs from the DUICC model 200. The first set of output may include the co-cluster structure that indicates the degree to which each item 102 and each user 104 belongs to a particular co-cluster 108. The second set of output from the DUICC model 200 may include a ranked list of items 102 for each user 104 where the items 102 are ranked by the user's preference scores 212. That is, certain items 102 that the DUICC model 200 has determined to have higher preference scores 212 (i.e., are more preferred by the user 104) may be ranked higher in the list. The ranked list of items 102 output by the DLCC module 210 may be sorted and a number of the top-ranked items 102 may be presented to the user 104 as recommendations.

Consistent with the present concepts, as the users 104 continue to interact with the items 102, the DUICC model 200 may continue to update the parameters. When a new user 104 is introduced to the DUICC environment 100, the DUICC model 200 can build a user profile 208 for the new user 104 on the fly based on the new user's interactions 106 with the items 102. When a new item 102 is introduced to the DUICC environment 100, the DUICC model 200 may update the co-cluster structure, including retraining the item embeddings 204 such that the new item's affinity scores 110 to the co-clusters 108 can be calculated. Accordingly, inferring the preferences 212 of individual users 104 (including new users 104 or existing users 104 with new interactions 106) can be done on-the-fly, but retraining the DUICC model 200 to account for new items 102 may take some time. For example, the DUICC model 200 may be retrained for new items 102 every day or every week, as desired or necessary.

The memory complexity and the time complexity of the DUICC model may be more efficient than conventional recommendation models. The below table compares the model complexity of some example models.

TABLE 1

| Model | Memory | Infer User Profile | Add/Remove Item |
|---|---|---|---|
| BPR | $\mathcal{O}((|\mathcal{U}|+|I|)d)$ | $\mathcal{O}(|I_u||I|)$ | $\mathcal{O}(|I_u||I|)$ |
| WRMF | $\mathcal{O}((|\mathcal{U}|+|I|)d)$ | $\mathcal{O}(|I|)$ | $\mathcal{O}(|I|)$ |
| NeuMF | $\mathcal{O}((|\mathcal{U}|+|I|)d)$ | $\mathcal{O}(|I|)$ | $\mathcal{O}(|I|)$ |
| UCML | $\mathcal{O}((|\mathcal{U}|+|I|)d)$ | $\mathcal{O}(|I_u||I|)$ | $\mathcal{O}(|I_u||I|)$ |
| DUICC | $\mathcal{O}((2N+|I|)d)$ | $\mathcal{O}(|I_u|)$ | $\mathcal{O}(1)$ |

For instance, the DUICC model may consume memory in the order of $\mathcal{O}((2N+|I|)d)$. Conventional recommendation models, such as Bayesian Personalized Ranking ("BPR"), Weighted Regularized Matrix Factorization ("WRMF"), Neural Collaborative Filtering/Neural Matrix Factorization ("NeuMF"), and Uniform Collaborative Metric Learning ("UCML"), consume memory in the order of $\mathcal{O}((|\mathcal{U}|+|I|)d)$. Therefore, the DUICC model may consume much less memory ($N \ll |\mathcal{U}|$) than conventional recommendation models, because the DUICC model may not explicitly store user representations ($\mathcal{O}(|\mathcal{U}|d)$) and co-cluster assignments ($\mathcal{O}((|\mathcal{U}|+|I|)N)$) that are intractable for large-scale datasets.

Moreover, the time complexity for the DUICC model to infer user profiles from scratch may be in the order of $\mathcal{O}(|I_u|)$, and the time complexity of the DUICC model to incrementally add or remove interaction records from a user profile may be in the order of $\mathcal{O}(1)$. In comparison, the time complexity of inferring user profiles or incrementally adding or removing interaction records from a user profile for BPR and UCML are $\mathcal{O}(|I_u||I|)$ and for WRMF and NeuMF are $\mathcal{O}(|I|)$. Accordingly, the DUICC model may be substantially faster than conventional recommendation models when inferring user profiles from scratch and when incrementally adding or removing interaction records from user profiles.

Consistent with the present concepts, DUICC may be an end-to-end recommendation model that can detect and leverage fine-grained co-clusters at scale. Moreover, DUICC can possess low online serving cost and can update user profiles on-the-fly, which may be critical for online services that need to adapt to fresh user feedback quickly.

DUICC can provide several advantages over conventional recommendation algorithms. First, DUICC may provide a unified approach to recommendation and co-clustering. For instance, the DUICC model 200 may include the DLCC module 210 to support co-clustering as part of the end-to-end recommendation pipeline. As a middle layer between entity representations and supervision, the DLCC module 210 may learn to construct fine-grained and overlapping user-item co-clusters along with entity representations. Unlike conventional approaches that require a separate and non-differentiable clustering procedure, the DLCC module 210 can provide a unified way to jointly optimize for recommendation and co-clustering. Empirical results from an experiment (described in detail below) showed that the DLCC module 210 may allow the DUICC model 200 to substantially improve accuracy on very large and sparse datasets across users with diverse activity levels. Specifically, DUICC outperformed competitive baselines by 47.5% (mean reciprocal rank (MRR)) on web-scale sparse datasets, while maintaining competitive performance on datasets with denser user-item interactions. DUICC may be able to provide improved recommendation even with sparse user-item interactions, because the latent co-cluster structures (i.e., the clusters of similar items and similar users) have been detected.

Second, DUICC can natively support efficient inference for real-time recommendations. DUICC can achieve this through the attention-based itemset aggregator module 206, which can construct user profiles by aggregating over item embeddings in constant time $O(1)$. This can enable real-time recommendations when new information becomes available, as well as provide an efficient and immediate way to honor privacy and data governance when users delete items from their profiles.

Third, DUICC may be highly memory efficient during training, because DUICC does not require storing explicit user representations and co-cluster assignments for users and items. Thus, DUICC can enable scaling to billions of users and millions of items, for example.

Lastly, in addition to generating co-clusters that are useful for recommendation, DUICC can discover co-clusters that are interpretable and coherent. Accordingly, DUICC can provide recommendations in a richer way. For example, DUICC can provide rationales or explanations for the recommendations. That is, the user may be informed of the reasons for a recommendation: "We recommend the website for Knowledge Discovery and Data Mining (KDD) 2021 Call for Research Paper (CFP) because of your interest in KDD 2020 CFP." Moreover, DUICC can provide structure to the recommended items. For instance, the recommended items presented to the user may be grouped according to their co-cluster affiliations, which can be preferable to just presenting a flat list of recommended items. Additionally, grouping the recommended items according to their co-cluster membership can allow the user to control the recommendations (or provide feedback) on a co-cluster level rather than on an item level. For example, the user may provide an input through a GUI to indicate that she does not want to see recommendations similar to one or more recommended items presented to her, which may pertain to one or more co-clusters.

An experiment was conducted to evaluate the performance of an example DUICC model compared to conventional baseline models on the recommendation task and on the co-clustering task. The specific details of the experiment and the specific implementations of the example DUICC model are provided for illustration purposes. The DUICC model, consistent with the present concepts, is not necessarily limited to the specific implementations described herein. Many other alternative implementations are possible.

For the experiment, three test datasets (Web-35M, LastFM-17M, and MovieLens-10M) were obtained. The Web-35M dataset recorded website hosts visited by users, the LastFM-17M dataset recorded the number of times that listeners play songs by certain artists, and the MovieLens-10M dataset recorded movie ratings by users and treated ratings greater than or equal to four as positive feedback. These three test datasets varied in size, sparsity, and distribution as shown below in Table 2. The sparsity can be calculated as the number of entries (i.e., interactions) divided by the product of the number of users and the number of items.

TABLE 2

| Dataset | # Users | # Items | # Entries | Sparsity |
|---|---|---|---|---|
| Web-35M | 3,794,691 | 427,147 | 34,870,333 | $2.2 \times 10^{-5}$ |
| LastFM-17M | 359,126 | 87,709 | 17,423,558 | $5.5 \times 10^{-4}$ |
| MovieLens-10M | 136,674 | 13,681 | 9,977,455 | $5.3 \times 10^{-3}$ |

To evaluate the recommendation task performance of the models using the offline test datasets, the common hold-out paradigm was used by holding out a set of users and their interactions from each dataset for validation and testing. In this experiment, 10,000 users each for the Web-35M dataset and 10% of the users each for the LastFM-17M dataset and the MovieLens-10M datasets were held out, so that the users in the validation and testing sets were not seen by the models during training. For the hold-one-out evaluation, the most recent interaction from each user was held out for prediction and the rest were used as inputs to the models. The best performing model on the validation set was chosen, and the performance of the chosen model on the test set was reported in terms of mean reciprocal rank ("MRR") and Hit Ratio@50 ("HR@50"), as shown in Table 3 below.

To evaluate the item co-clustering task performance of the models, item-co-cluster coherence was measured using human judgment. People were given a set of three items from a co-cluster and a random intruder, and were asked to identify the item that did not belong with the others. Each co-cluster was labeled by five different people. To report overall precision for each method, the mean precision for each co-cluster was computed as the percentage of people who correctly identified the intruder, and then the mean precision was averaged across all 100 co-clusters.

The recommendation task baselines used in this experiment included Popularity, User-Based k-Nearest-Neighbor ("UserKNN"), BPR, WRMF, NeuMF, and UCML. The co-clustering task baselines used in this experiment included X-Clustering in combination with BPR, WRMF, and NeuMF, as well as BigClam.

All the models were trained for 150 epochs with a learning rate of 0.001 and early stopping. That is, the optimal number of training iterations was selected through a validation set. To control for expressive power, the dimensionality parameter was varied, d={32, 64}, for embeddings in the DUICC model and the baseline models.

For the DUICC model, 1000 negative items were sampled for each minibatch with size 1024, and the learning rate was divided by 10 for every 50 epochs. The hyperparameters for model selection were as follows: $\alpha \in \{0.1, 0.05\}$, $\lambda \in \{1e-6, 1e-4\}$, and N={512, 1024, 2048}. The DUICC model was implemented using TensorFlow and was trained on four NVIDIA Tesla P100 graphics cards, which took less than two days to finish.

The baseline models, including BPR, WRMF, NeuMF, and UCML, were implemented using the OpenRec library and were experimented with different levels of L2 regularization (0, 1e-6, 1e-5, 1e-4). During inference, all model parameters were frozen except the user embeddings, and were fine-tuned for 150 epochs using validation or testing datasets.

For X-Clustering, MiniBatchKMeans was used to jointly group users and items into 2048 clusters. KMeans was run three times and the best results were picked according to inertia. For BigClam, the original implementation and recommended parameter settings were adopted to detect 2048 co-clusters.

The experimental results for the hold-one-out recommendation task are presented in Table 3 below. The best result of each column is in italics. The parameter d represents the dimensionality of the item embedding $e_i$.

TABLE 3

| | Model | | | | | |
|---|---|---|---|---|---|---|
| | Web-35M | | LastFM-17M | | MovieLens-10M | |
| | MMR | HR@50 | MMR | HR@50 | MMR | HR@50 |
| Popularity | 0.0162 | 0.1570 | 0.0312 | 0.1763 | 0.0247 | 0.1993 |
| | | | d = 32 | | | |
| UserKNN | 0.0510 | 0.1608 | 0.0813 | 0.3322 | *0.0483* | 0.2897 |
| BPR | 0.0471 | 0.2162 | 0.0816 | 0.3620 | 0.0475 | *0.2925* |
| WRMF | 0.0564 | 0.2636 | 0.0821 | 0.3468 | 0.0460 | 0.2897 |
| NeuMF | 0.0483 | 0.2364 | 0.0561 | 0.3103 | 0.0420 | 0.2873 |
| UCML | 0.0143 | 0.0937 | 0.0718 | 0.3338 | 0.0432 | 0.2777 |
| DUICC | *0.0832* | *0.3232* | *0.0910* | *0.3735* | 0.0480 | 0.2897 |
| | +47.5% | +22.6% | +10.8% | +3.2% | −0.6% | −1.0% |
| | | | d = 64 | | | |
| UserKNN | 0.0507 | 0.1626 | 0.0844 | 0.3373 | 0.0475 | 0.2853 |
| BPR | 0.0567 | 0.2479 | 0.0871 | 0.3758 | *0.0491* | *0.3054* |
| WRMF | 0.0654 | 0.2965 | 0.0885 | 0.3745 | 0.0489 | 0.2915 |
| NeuMF | 0.0780 | 0.3133 | 0.0572 | 0.3285 | 0.0407 | 0.2981 |
| UCML | 0.0195 | 0.1216 | 0.0760 | 0.3470 | 0.0466 | 0.2852 |
| DUICC | *0.0878* | *0.3308* | *0.0954* | *0.3888* | 0.0489 | 0.3029 |
| | +12.6% | +5.6% | +7.8% | +3.8% | −0.4% | −0.8% |

The DUICC model performed substantially better than the baseline models on the Web-35M and LastFM-17M datasets, and performed competitively on the MovieLens-10M datasets. Under both the MRR and HR@50 metrics, and independent of the dimensionality size d of the latent representations, the DUICC model substantially outperformed all the baselines on the Web-35M and LastFM-17M datasets with the gains becoming larger as the interaction signals become sparser (see sparsity of the three datasets in Table 2 above). Moreover, the DUICC model achieved this boost in constant time per user during inference, whereas the other baselines were much slower. However, on the MovieLens-10M dataset, UserKNN, BPR, WRMF, and the DUICC models performed closely (with less than 1% difference). This may indicate that advanced methods such as neural architectures do not necessarily improve performance on dense datasets and may be subject to overfitting.

To evaluate how the models perform under different levels of data availability during inference, the number of interactions used during testing was varied for users who had more than 20 interactions. The results demonstrated that the DUICC model outperformed all baselines across a variety of number of observed interactions for a user, and the DUICC model's performance improved as more interaction data were made available (d=64). Therefore, the DUICC model's recommendation performance improves as more interaction data becomes available (i.e., as the number of user interactions at inference time increases).

Furthermore, the DUICC model's performance boosted when the number of co-clusters (N) was increased so that the model had more capacity for fine-grained clustering. As such, the recommendation performance of the DUICC model would improve as the number of co-clusters (N) increases.

The DUICC model's outstanding recommendation performance from the experiment demonstrates that its detected co-clusters are highly useful for recommendation. The experimental results show that the DUICC model had the highest average precision coherence while also generating a high number of valid item co-clusters.

Regarding the co-clustering task, the DUICC model and WRMF were the two top-performing models with respect to precision, indicating that these two models produce semantically meaningful item embeddings and the most coherent item co-clusters among all the tested models. However, even though WRMF-Clustering was good at discovering coherent item co-clusters, it fell short by detecting far fewer number (about a third) of valid co-clusters compared to the DUICC model. (A valid co-cluster was defined as one with at least 20 users and 20 items.) The higher number of valid co-clusters detected by the DUICC model compared to WRMF can be interpreted as the DUICC model identifying many more fine-grained co-clusters while maintaining comparable precision. This more fine-grained co-clustering may be one factor that explains the DUICC model outperforming WRMF in recommendation.

Figure 5:
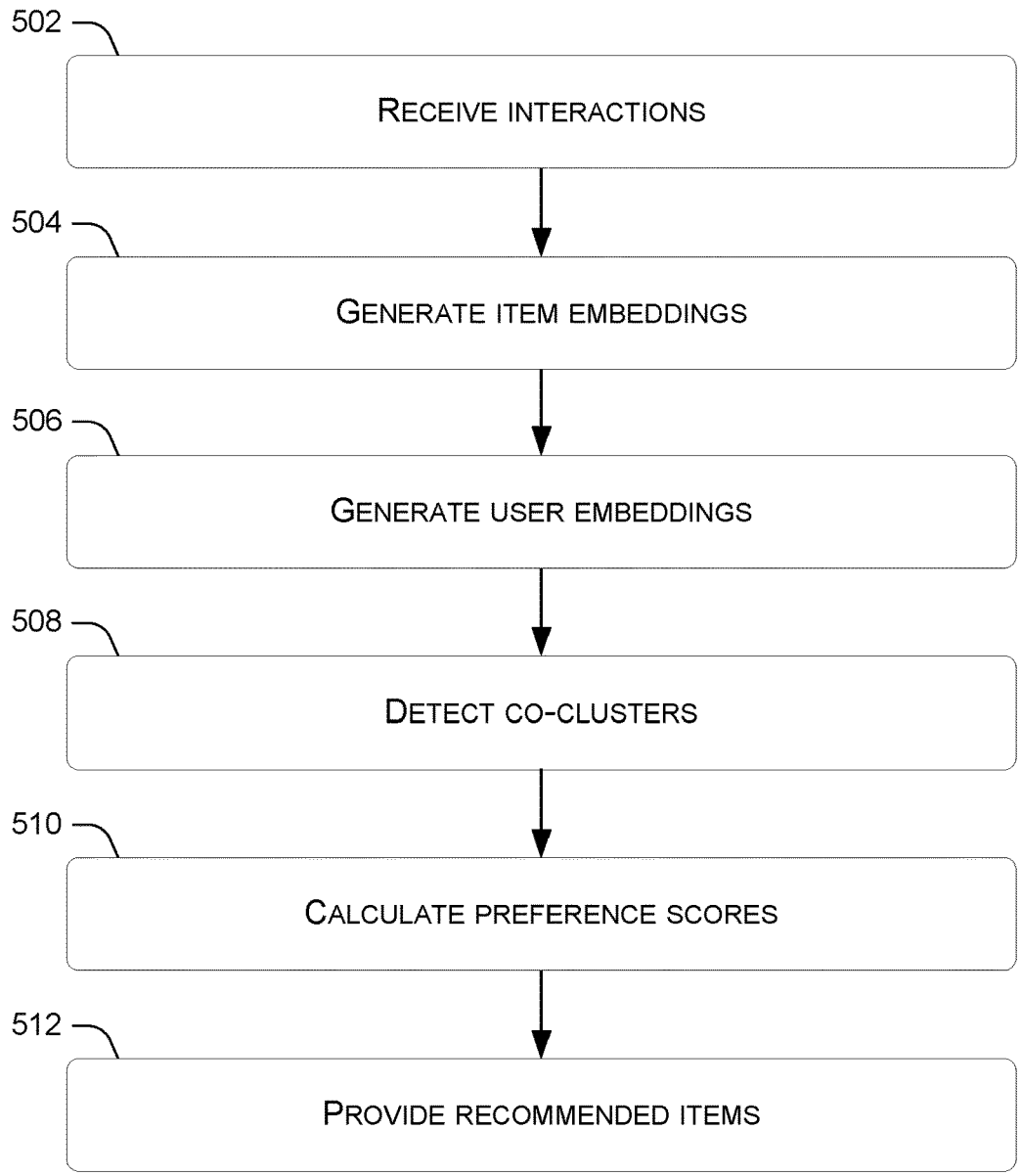
FIG. 5 shows a flowchart illustrating a differentiable user-item co-clustering method, consistent with the present concepts.

FIG. 5 shows a flowchart illustrating a DUICC method 500, consistent with the present concepts. This example DUICC method 500 is presented for illustration purposes and is not meant to be exhaustive or limiting. The acts in the DUICC method 500 may be performed in the order presented, in a different order, or in parallel or simultaneously, or may be omitted.

In act 502, interactions between users and items may be received. The interactions may include a set of items for each user, indicating that a particular user has interacted with the set of items in the past. In one implementation, the interactions may be an input to a DUICC model.

In act 504, item embeddings may be generated. The item embeddings may be generated from the items in the interactions received in act 502. An item embedding may be a vector representation of an item. In one implementation, the item embeddings may be randomly initialized to be fine-tuned during training.

In act 506, user embeddings may be generated. For each user, user embeddings (or user profiles) may be generated based on the item embeddings for the items that the user has interacted with. For example, in one implementation, as explained above in connection with FIG. 3 and Formula 2, a co-cluster-conditional attention mechanism may be used to construct the user embeddings for the user by aggregating the item embeddings.

In act 508, co-clusters may be detected. That is the co-cluster structure may be learned by determining the affinity of each item and each user to a preset number of co-clusters. For example, in one implementation, as explained above in connection with FIG. 4 and Formulas 5-7, the co-cluster assignments of users and items may be randomly initialized and then fine-tuned using a loss function that is dependent on both the item-co-cluster affinity scores and the user-co-cluster affinity scores. Optionally, the items' affinity scores and the users' affinity scores to the co-clusters (i.e., the latent co-cluster structure) may be output by the DUICC model as the co-clustering task output.

In act 510, preference scores for the items may be calculated. That is, a preference score for each item (i.e., how likely a user will want to interact with an item) may be calculated for one user or for all users. For example, in one implementation, as explained above in connection with FIG. 4 and Formula 8, the amount of overlap between the user's co-cluster membership and the item's co-cluster membership may be aggregated for all co-clusters to calculate a preference score for the user and the item. Optionally, the preference scores for one user or for all users may be output by the DUICC model as the recommendation task output.

In act 512, recommended items may be provided to a user. In one example implementation, the items may be sorted or ranked based on their preference scores for the user calculated in act 508. All of the ranked items or a top-ranked subset of the items may be sent as the recommended items to the user (or to the user's device). The recommended items may be presented to the user on a GUI for consumption or interaction.

Figure 6:
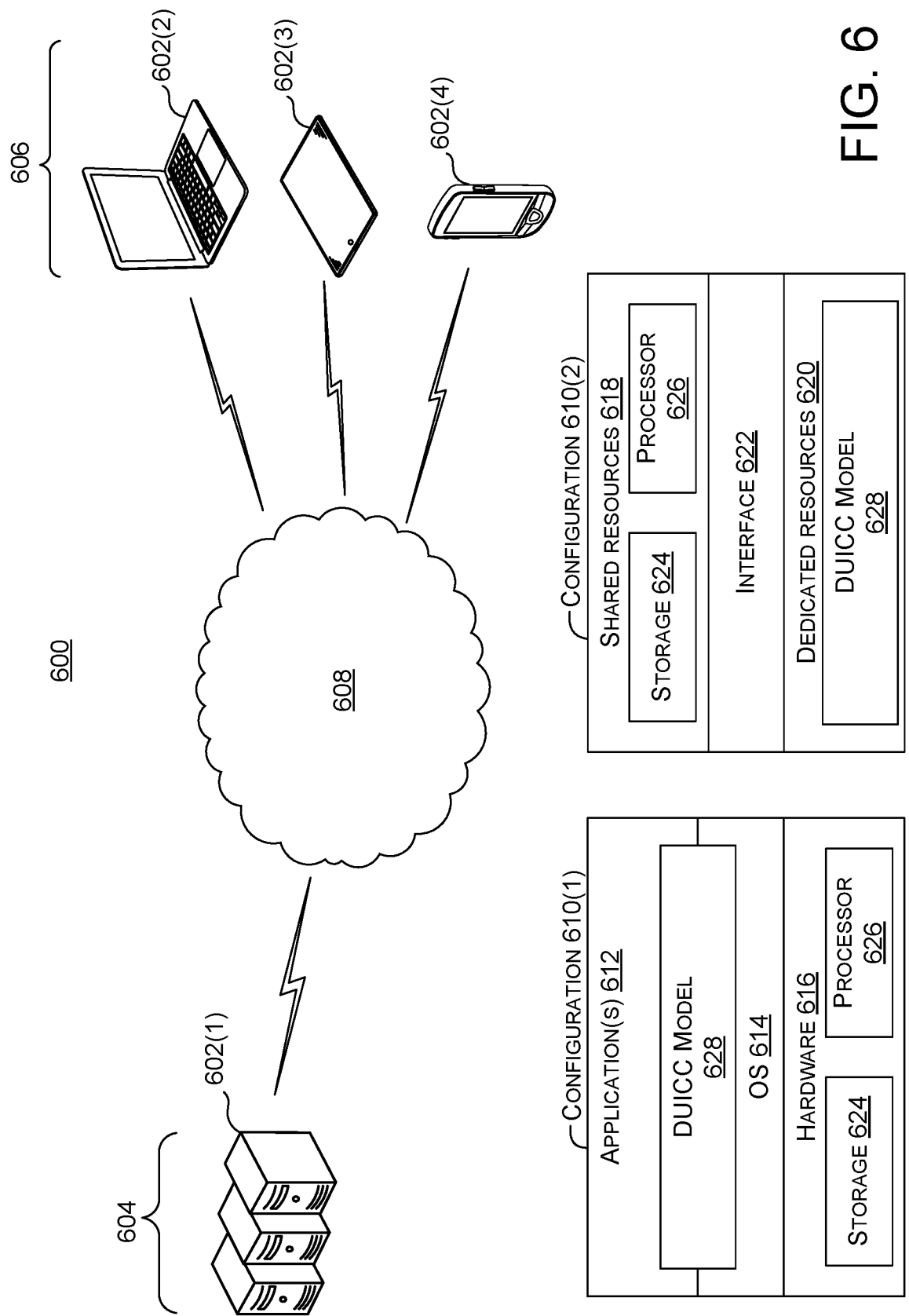
FIG. 6 shows a differentiable user-item co-clustering system, consistent with the present concepts.

FIG. 6 shows an example DUICC system 600, consistent with the present concepts. For purposes of explanation, the DUICC system 600 may include devices 602. Examples of devices 602 can include personal computers, desktop computers, servers, notebook computers, cellular phones, smartphones, personal digital assistants, tablets or pad type computers, mobile computers, cameras, appliances, virtual reality headsets, video game consoles, controllers, smart devices, IoT devices, vehicles, watches, wearables, set-top boxes, game systems, automobile entertainment or navigation consoles, etc., and/or any of a myriad of ever-evolving or yet to be developed types of electronic devices.

In the example shown in FIG. 6, the devices 602 may include a server device 602(1) (or a collection of servers), a laptop 602(2), a tablet 602(3), and a smartphone 602(4). For purposes of explanation, device 602(1) can be viewed as being a server-side device 604 (or cloud-based resource), and devices 602(2)-602(4) can be viewed as being client-side devices 606 (or client devices). The number of the devices 602 and the client-versus-server side of the devices 602 described and depicted are intended to be illustrative and non-limiting. The devices 602 can communicate with one another via one or more networks 608 and/or can access the Internet over the one or more networks 608.

The term "device," "computer," or "computing device" as used herein can mean any type of device that has some amount of processing capability and/or storage capability. Processing capability can be provided by one or more hardware processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, optical storage devices (e.g., CDs, DVDs etc.), and/or remote storage (e.g., cloud-based storage), among others. As used herein, the term "computer-readable media" can include transitory propagating signals. In contrast, the term "computer-readable storage media" excludes transitory propagating signals. Computer-readable storage media may include computer-readable storage devices. Examples of computer-readable storage devices may include volatile storage media, such as RAM, and non-volatile storage media, such as hard drives, optical discs, and flash memory, among others.

In some implementations, the server-side device 604, the client-side devices 606, and/or a combination may perform all or parts of the DUICC method 500 as well as other acts described herein. For example, user-item interaction data may be collected by the client-side devices 606 that a user uses to interact with or consume one or more items. The server-side device 604 may host a DUICC model that can receive the user-interaction data for a set of users from the client-side devices 606. The server-side device 604 may receive an identification of a user and send a list of recommended items to the client-side device 606 to be presented to the user. The list of recommended items may be accompanied by the preference scores determined by the DUICC model and/or the co-cluster assignments of those recommended items. In one example implementation, the server-side device 604 may perform training of the DUICC model, and the client-side device 606 may perform inferencing (providing recommendations). In another example implementation, a DUICC model may run on a client-side device 606. For example, the client-side device 606 may transfer from the server-side device 604 a subset of the DUICC model. Depending on storage and processing capabilities of the client-side device 604, a smaller DUICC model may be used by setting a smaller dimensionality size for smaller embeddings. The DUICC model on the client-side device 604 may be used for inferring recommendations.

FIG. 6 shows two example device configurations 610(1) and 610(2) that can be employed by any or all of the devices 602. Individual devices 602 can employ either of the configurations 610(1) or 610(2), or an alternate configuration. One instance of each configuration 610 is illustrated in FIG. 6. The configuration 610(1) may represent an operating system ("OS") centric configuration. The configuration 610(2) may represent a system on a chip ("SoC") configuration. The configuration 610(1) can be organized into one or more applications 612, operating system 614, and hardware 616. The configuration 610(2) may be organized into shared resources 618, dedicated resources 620, and an interface 622 there between.

In either configuration 610, the device 602 can include a storage 624 and a processor 626. The device 602 can also include a DUICC model 628. For instance, the DUICC model 628 may be the DUICC model 200 described above or a similar model.

As mentioned above, the configuration 610(2) can be thought of as a SoC type design. In such a case, functionality provided by the device 602 can be integrated on a single SoC or multiple coupled SoCs. One or more processors 626 can be configured to coordinate with shared resources 618, such as storage 624, etc., and/or one or more dedicated resources 620, such as hardware blocks configured to perform certain specific functionality. Thus, the term "processor" as used herein can also refer to central processing units (CPUs), graphical processing units (GPUs), controllers, microcontrollers, processor cores, or other types of processing devices.

The output from the DUICC model 200 may be presented to a user in graphical form using a GUI, for example, by the client-side device 606. For example, the co-clusters 108 of the items 102 determined by the DUICC model 200 may be presented to a user as groupings of the items 102. Similarly, the co-clusters 108 of the users 104 determined by the DUICC model 200 may be presented to a user as groupings of the users 104. As explained above, the groupings of the items 102 and/or the users 104 determined by the DUICC model 200 are more accurate, reliable, and similar than groupings determined by conventional techniques, because the co-clustering consistent with the present concepts is based on actual past consumption behavior. That is, users who have similar interactions with the items tend to be grouped together, and items that are consumed by similar users tent to be grouped together. Furthermore, as explained above, the client-side device 606 can generate graphical content and present groupings of the items 102 and/or the users 104 even with sparse data, i.e., even with only a few interactions between the items 102 and the users 104, compared to conventional techniques. Moreover, as explained above, the time complexity for the DUICC model 200 is superior to conventional techniques, which enables more efficient use of computing resources and can provide the co-clustering of the items 102 and the users 104 more quickly.

Additionally, the ranked list of items 102 (or a subset of the top-ranked items 102) may be presented to a user in a GUI. For instance, the client-side device 606 may generate graphical content that includes a set of top-ranked items 102. Consistent with the present concepts, these ranked items 102 were determined using affinity scores calculated based on actual past consumption behavior of many users and items, and therefore are more accurate and more likely to be preferred than items recommended by conventional techniques. Thus, the top ranked items 102 presented by the client-side device 606 are more likely to result in user interaction. Furthermore, the client-side device 606 may experience user interaction with even fewer items 102 presented, and therefore can request fewer items from the server-side device 604, which saves on bandwidth usage and prevents network congestion. Moreover, the ability to present items with higher confidence of user interaction means that fewer items need to be presented, which saves on screen real estate. Alternatively, the saved screen real estate can be utilized by sizing the highest ranked items 102 more prominently on the screen to further encourage user interaction with those items.

Generally, any of the functions described herein can be implemented using software, firmware, hardware (e.g., fixed-logic circuitry), or a combination of these implementations. The term "component" or "module" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component or module are platform-independent, meaning that they may be implemented on a variety of commercial computing platforms having a variety of processing configurations.

The DUICC system 600 illustrated in FIG. 6 is merely one example. The DUICC system 600 need not include all the example elements described in connection with FIG. 6, and the DUICC system 600 may also include additional elements not explicitly described in connection with FIG. 6.

The present concepts have a very wide range of applications, because the types of items and the types of interactions are not limited or restricted. Further to the list of example items and example interactions provided above, another example application may include a DUICC model that receives interaction data that represents advertisements that users have clicked on to recommend additional advertisements that users are most likely to want to interact with. Such a DUICC model can help increase advertisement revenues as well as enhance user experience. As another example, a DUICC model may process contents (documents, files, URLs, contacts, portals, webpages, etc.) that employees in an organization (e.g., a corporation) have interacted with to learn clusters or groups of employees and contents, and to provide content recommendations to the employees that they are likely to want to view. Such a DUICC model can help increase the productivity of the organization.

The present concepts provide DUICC that can unify recommendation and co-clustering. DUICC can leverage the observation that the consumption behavior of users can be explained by an underlying set of co-clusters that tie together related users and related items. Experimental results have shown DUICC to be computationally efficient and to demonstrate strong recommendation performance on sparse datasets. Thus, DUICC can enable online inference and yield item co-clusters that are interpretable and coherent. DUICC can also allow using co-clusters for explanations, direct preference elicitation at the co-cluster level, and detection of information silos in co-clusters (i.e., information known broadly in a co-cluster but limited knowledge elsewhere).

Various examples have been described above. Although the subject matter has been described in language specific to example structural features and/or methodological acts, the subject matter defined in the appended claims is not necessarily limited to the specific features or acts described above. Rather, the specific features and acts described above are presented as example forms of implementing the claims, and other features and acts that would be recognized by one skilled in the art are intended to be within the scope of the claims.

Various examples are described above. Additional examples are described below. One example includes a system comprising a processor and storage storing instructions which, when executed by the processor, cause the processor to: receive interactions between users and items, based on the interactions, train a machine learning model to detect co-clusters of the users and the items by generating item embeddings representing the items, generating user embeddings representing the users, and calculating item-co-cluster affinity scores of the items to the co-clusters and user-co-cluster affinity scores of the users to the co-clusters based on the item embeddings, the user embeddings, and co-cluster embeddings representing the co-clusters, and output the item-co-cluster affinity scores and the user-co-cluster affinity scores.

Another example can include any of the above and/or below examples where the instructions further cause the processor to generate a particular user embedding representing a particular user by aggregating particular item embeddings representing particular items that the particular user has interacted with according to the interactions.

Another example can include any of the above and/or below examples where a computational time for aggregating the particular item embeddings is in an order of constant time.

Another example can include any of the above and/or below examples where the particular user embedding is a weighted sum of the particular item embeddings.

Another example can include any of the above and/or below examples where the machine learning model uses an attention head for each of the co-clusters to generate the user embeddings.

Another example can include any of the above and/or below examples where the user embeddings are generated using a linear projection.

Another example can include any of the above and/or below examples where the machine learning model detects the co-clusters by co-clustering the item embeddings and the user embeddings into the co-clusters.

Another example can include any of the above and/or below examples where the machine learning model detects the co-clusters by calculating the item-co-cluster affinity scores based on the item embeddings and the co-cluster embeddings and calculating the user-co-cluster affinity scores based on the user embeddings and the co-cluster embeddings.

Another example can include any of the above and/or below examples where calculating a particular item-co-cluster affinity score for a particular item and a particular co-cluster comprises calculating a dot product of a particular item embedding representing the particular item and a particular co-cluster embedding representing the particular co-cluster and calculating a particular user-co-cluster affinity score for the particular user and the particular co-cluster comprises calculating a dot product of a particular user embedding representing the particular user and the particular co-cluster embedding.

Another example can include any of the above and/or below examples where the machine learning model is trained using a softmax classification loss function.

Another example can include any of the above and/or below examples where the machine learning model is trained by holding out an individual item in a set of items that a particular user has interacted with and using the set of items that have not been held out to train the machine learning model using the softmax classification loss function to correctly predict the individual item that has been held out.

Another example includes a computer readable storage medium storing instructions which, when executed by a processor, cause the processor to: receive a user identification associated with a particular user, calculate preference scores associated with items for the particular user based on user-co-cluster affinity scores and item-co-cluster affinity scores determined by a machine learning model that receives interactions between the items and users, provides item embeddings representing the items, generates user embeddings representing the users by aggregating the item embeddings, and detects co-clusters of the items and the users based on the user embeddings and the item embeddings, and output a set of the items for the particular user based on the preference scores.

Another example can include any of the above and/or below examples where the instructions further cause the processor to receive a new interaction between the particular user and a particular item and update a particular user embedding representing the particular user based on the particular item using the machine learning model.

Another example can include any of the above and/or below examples where a computational time for updating the particular user embedding is in an order of constant time.

Another example can include any of the above and/or below examples where the instructions further cause the processor to remove a particular item from particular interactions associated with the particular user based on a time value associated with the particular item and update a particular user embedding representing the particular user based on the removal of the particular item using the machine learning model.

Another example includes a method comprising receiving an identification of a particular user, calculating preference scores associated with items for the particular user based on co-clusters of users and the items, the co-clusters being detected by a machine learning model from interactions between users and the items, the machine learning model calculating user-co-cluster affinity scores of the users to the co-clusters and item-co-cluster affinity scores of the items to the co-clusters, and outputting a set of the items for the particular user based on the preference scores.

Another example can include any of the above and/or below examples where the preference scores are calculated based on particular user-co-cluster affinity scores of the particular user to the co-clusters and the item-co-cluster affinity scores.

Another example can include any of the above and/or below examples where calculating the preference scores comprises using a min-sum pooling operation based on the particular user-co-cluster affinity scores and the item-co-cluster affinity scores.

Another example can include any of the above and/or below examples where calculating a particular preference score associated with a particular item for the particular user comprises calculating overlaps between the particular item and the particular user with respect the co-clusters and aggregating the overlaps across the co-clusters.

Another example can include any of the above and/or below examples where the method further comprises resenting the set of the items in groups based on the co-clusters.

The invention claimed is:

1. A system, comprising:
a processor;
storage storing instructions which, when executed by the processor, cause the processor to:
  receive interactions between a plurality of users and a plurality of items;
  based on the interactions, train a machine learning model to detect a plurality of co-clusters of the plurality of users and the plurality of items by:
    generating a plurality of item embeddings representing the plurality of items;
    generating a plurality of user embeddings representing the plurality of users based on weighted averages of the plurality of item embeddings by assigning weights to the plurality of items based on predictive strengths of the plurality of items, the weights varying across the plurality of co-clusters; and
    calculating a plurality of item-co-cluster affinity scores of the plurality of items to the plurality of co-clusters and a plurality of user-co-cluster affinity scores of the plurality of users to the plurality of co-clusters based on the plurality of item embeddings, the plurality of user embeddings, and a plurality of co-cluster embeddings representing the plurality of co-clusters; and
  output the plurality of item-co-cluster affinity scores and the plurality of user-co-cluster affinity scores.

2. The system of claim 1, wherein the machine learning model uses an attention head for each of the plurality of co-clusters to generate the plurality of user embeddings.

3. The system of claim 1, wherein the plurality of user embeddings are generated using a linear projection.

4. The system of claim 1, wherein the machine learning model detects the plurality of co-clusters by:
calculating the plurality of item-co-cluster affinity scores based on the plurality of item embeddings and the plurality of co-cluster embeddings; and
calculating the plurality of user-co-cluster affinity scores based on the plurality of user embeddings and the plurality of co-cluster embeddings.

5. The system of claim 4, wherein:
calculating an item-co-cluster affinity score of the plurality of item-co-cluster affinity scores for an item of the plurality of items and a co-cluster of the plurality of co-clusters comprises calculating a dot product of an item embedding of the plurality of item embeddings representing the item and a co-cluster embedding of the plurality of co-cluster embeddings representing the co-cluster; and
calculating a user-co-cluster affinity score of the plurality of user-co-cluster affinity scores for a user of the plurality of users and the co-cluster comprises calculating a dot product of a user embedding of the plurality of user embeddings representing the user and the co-cluster embedding.

6. The system of claim 1, wherein the machine learning model is trained using a softmax classification loss function.

7. The system of claim 6, wherein the machine learning model is trained by:
holding out an item in a set of items that a user of the plurality of users has interacted with; and
using the set of items that have not been held out to train the machine learning model using the softmax classification loss function to correctly predict the item that has been held out.

8. The system of claim 1, wherein instructions further cause the processor to:
calculate a cached scalar value based on the plurality of item embeddings,
wherein the plurality of user embeddings are generated based on the cached scalar value.

9. The system of claim 8, wherein the instructions further cause the processor to:
receive a new interaction between a user of the plurality of users and an item of the plurality of items;
recalculate the cached scalar value based on an item embedding of the plurality of item embeddings associated with the item; and
update a user embedding of the plurality of user embeddings associated the user based on the item embedding and the recalculated cached scalar value,
wherein a computational time for updating the user embedding is in an order of constant time with respect to a number of the interactions.

10. The system of claim 1, wherein the instructions further cause the processor to implement an itemset aggregator module that generates the plurality of user embeddings, parameters of the itemset aggregator module being shared across the plurality of users, the itemset aggregator module consuming constant memory with respect to a number of the plurality of users.

11. A hardware computer readable storage medium storing instructions which, when executed by a processor, cause the processor to:
train a machine learning model that detects co-clusters of a plurality of users and a plurality of items by:
receiving interactions between the plurality of users and the plurality of items;
generate item embeddings based on the interactions;
generate a plurality of user embeddings based on weighted sums of the items embeddings by assigning weights to the plurality of items based on predictive strengths of the plurality of items, the weights varying across the co-clusters;
learn co-cluster embeddings based on the item embeddings and the plurality of user embeddings; and
determine item-co-cluster affinity scores and user-co-cluster affinity scores based on the plurality of user embeddings, the item embeddings, and the co-cluster embeddings;
receive a user identification associated with a user of the plurality of users;
calculate preference scores associated with the plurality of items for the user based on the user-co-cluster affinity scores and the item-co-cluster affinity scores determined by the machine learning model; and
output a set of the plurality of items for the user based on the preference scores.

12. The hardware computer readable storage medium of claim 11, wherein the instructions further cause the processor to:
receive a new interaction between the user and an item of the plurality of items;
recalculate a cached scalar value based on an item embedding of the plurality of item embeddings associated with the item; and
update a user embedding of the plurality of user embeddings representing the user based on the item embedding and the recalculated cached scalar value using the machine learning model.

13. The hardware computer readable storage medium of claim 12, wherein a computational time for updating the user embedding is in an order of constant time with respect to a number of the interactions.

14. The hardware computer readable storage medium of claim 11, wherein the instructions further cause the processor to:
receive a new interaction between the user and an item of the plurality of items;
recalculate a cached scalar value based on an item embedding of the plurality of item embeddings associated with the item; and
update a user embedding of the plurality of user embeddings associated the user based on the item embedding and the recalculated cached scalar value,
wherein a computational time for updating the user embedding is in an order of constant time with respect to a number of the interactions.

15. The hardware computer readable storage medium of claim 11, wherein the instructions further cause the processor to implement an itemset aggregator module that generates the plurality of user embeddings, parameters of the itemset aggregator module being shared across the plurality of users, the itemset aggregator module consuming constant memory with respect to a number of the plurality of users.

16. A method, comprising:
detecting co-clusters of a plurality of users and a plurality of items from interactions between the plurality of users and the plurality of items using a machine learning model by:
generating a plurality of item embeddings representing the plurality of items based on the interactions;
generating a plurality of user embeddings representing the plurality of users based on weighted averages of the plurality of item embeddings by assigning weights to the plurality of items based on predictive strengths of the plurality of items, the weights varying across the co-clusters; and calculating a plurality of user-co-cluster affinity scores of the plurality of users to the co-clusters and a plurality of item-co-cluster affinity scores of the plurality of items to the co-clusters based on the plurality item embeddings, the plurality of user embeddings, and co-cluster embeddings representing the co-clusters;

receiving an identification of a user of the plurality of users;

calculating a plurality of preference scores associated with the plurality of items for the user based on a set of the plurality of user-co-cluster affinity scores associated with the user and the plurality of item-co-cluster affinity scores; and outputting a set of the plurality of items for the user based on the plurality of preference scores.

17. The method of claim 16, wherein calculating the plurality of preference scores comprises:

using a min-sum pooling operation based on the set of the plurality of user-co-cluster affinity scores and the plurality of item-co-cluster affinity scores.

18. The method of claim 16, wherein calculating a preference score of the plurality of preference scores associated with an item of the plurality of items for the user comprises:

calculating overlaps between the item and the user with respect the co-clusters; and aggregating the overlaps across the co-clusters.

19. The method of claim 16, further comprising:

presenting the set of the plurality of items in groups based on the co-clusters.

20. The method of claim 16, further comprising:

calculating a cached scalar value based on the plurality of item embeddings, the plurality of user embeddings being generated based on the cached scalar value;

receiving a new interaction between the user and an item of the plurality of items;

recalculating the cached scalar value based on an item embedding of the plurality of item embeddings associated with the item; and updating a user embedding of the plurality of user embeddings associated the user based on the item embedding and the recalculated cached scalar value, a computational time for updating the user embedding is in an order of constant time with respect to a number of the interactions.

* * * * *